United States Patent
McClintock et al.

(10) Patent No.: US 11,327,953 B2
(45) Date of Patent: *May 10, 2022

(54) PATTERN-BASED DETECTION USING DATA INJECTION

(71) Applicant: Amazon Technologies, Inc., Seattle, WA (US)

(72) Inventors: Jon Arron McClintock, Seattle, WA (US); Brandon William Porter, Yarrow Point, WA (US); Donghui Zhuo, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/692,100

(22) Filed: Nov. 22, 2019

(65) Prior Publication Data
US 2020/0089669 A1    Mar. 19, 2020

Related U.S. Application Data

(63) Continuation of application No. 14/133,545, filed on Dec. 18, 2013, now Pat. No. 10,489,375.

(51) Int. Cl.
*G06F 16/23*    (2019.01)
(52) U.S. Cl.
CPC ............................... *G06F 16/2365* (2019.01)
(58) Field of Classification Search
None
See application file for complete search history.

(56) References Cited

U.S. PATENT DOCUMENTS

| | | | |
|---|---|---|---|
| 6,236,933 B1 | 5/2001 | Lang | |
| 6,597,906 B1 | 7/2003 | Van Leeuwen et al. | |
| 6,721,572 B1 | 4/2004 | Smith et al. | |
| 7,020,468 B2 | 3/2006 | Squibbs et al. | |
| 7,127,213 B2 | 10/2006 | Haymes et al. | |
| 7,185,232 B1 * | 2/2007 | Leavy | G06F 16/254 |
| 7,603,115 B2 | 10/2009 | Banavar et al. | |
| 8,589,070 B2 | 11/2013 | Ban et al. | |
| 9,043,135 B2 | 5/2015 | Dave et al. | |

(Continued)

FOREIGN PATENT DOCUMENTS

| | | |
|---|---|---|
| DE | 10025725 | 12/2001 |
| EP | 1777890 | 4/2007 |

OTHER PUBLICATIONS

Non-Final Office Action for U.S. Appl. No. 13/601,804, dated Oct. 18, 2013, 18 pages.

(Continued)

*Primary Examiner* — Son T Hoang
(74) *Attorney, Agent, or Firm* — Robert C. Kowert; Kowert, Hood, Munyon, Rankin & Goetzel, P.C.

(57) ABSTRACT

Pattern based detection of data usage is facilitated using data injection. Data values are injected in one or more storage locations accessible to a plurality of services or included in service requests. Service interactions among the services are compared to a set of patterns. The set of patterns are configured to match the data values. By comparing the service interactions to the patterns, one or more of the service interactions are determined to include individual ones of the data values. Data are generated indicating a presence of the data values in the services.

18 Claims, 14 Drawing Sheets

(56) References Cited

U.S. PATENT DOCUMENTS

| | | | |
|---|---|---|---|
| 9,057,620 | B2 | 6/2015 | Dave et al. |
| 9,709,409 | B2 | 7/2017 | Dave et al. |
| 2004/0172467 | A1* | 9/2004 | Wechter .............. G06F 16/2365 |
| 2006/0135180 | A1 | 6/2006 | Jakel et al. |
| 2008/0009324 | A1 | 1/2008 | Patel |
| 2009/0017840 | A1 | 1/2009 | Camp, Jr. et al. |
| 2009/0209271 | A1 | 8/2009 | Reed |
| 2009/0247137 | A1 | 10/2009 | Awad |
| 2010/0100774 | A1* | 4/2010 | Ding ....................... G06F 16/23 |
| 2010/0240346 | A1 | 9/2010 | Jain et al. |
| 2010/0250269 | A1 | 9/2010 | Rappaport |
| 2011/0239048 | A1* | 9/2011 | Andrade ............ G06F 16/2365 |
| 2012/0009890 | A1 | 1/2012 | Curcio et al. |
| 2012/0021776 | A1 | 1/2012 | Phillips |
| 2012/0131212 | A1 | 5/2012 | Tang et al. |
| 2012/0210428 | A1* | 8/2012 | Blackwell ............... G06F 16/23 |
| 2012/0240185 | A1* | 9/2012 | Kapoor ............... G06F 16/2358 |
| 2013/0024107 | A1 | 1/2013 | Xie et al. |
| 2013/0225204 | A1 | 8/2013 | Mathews |
| 2013/0325326 | A1 | 12/2013 | Blumenberg |
| 2014/0199980 | A1 | 7/2014 | Rao et al. |
| 2014/0200038 | A1 | 7/2014 | Rao et al. |
| 2014/0259173 | A1* | 9/2014 | Parcel ................. G06F 16/2358 |

OTHER PUBLICATIONS

Final Office Action for U.S. Appl. No. 13/601,804, dated Apr. 21, 2014, 19 pages.

International Search Report and Written Opinion for International PCT Application No. PCT/US2013/078552, dated Mar. 21, 2014, 11 pages.

International Search Report and Written Opinion for International PCT Application No. PCT/US2014/010672, dated Mar. 21, 2014, 11 pages.

Notice of Allowance for U.S. Appl. No. 13/601,804, dated Oct. 16, 2014, 12 pages.

Non-Final Office Action for U.S. Appl. No. 13/743,246, dated Dec. 18, 2014, 13 pages.

Non-Final Office Action for U.S. Appl. No. 13/743,242, dated Mar. 10, 2015, 17 pages.

Notice of Allowance for U.S. Appl. No. 13/601,804, dated Mar. 30, 2015, 13 pages.

Final Office Action for U.S. Appl. No. 13/743,246, dated May 4, 2015, 21 pages.

Notice of Allowance for U.S. Appl. No. 14/602,873, dated May 5, 2015, pp. 1-14.

* cited by examiner

PATTERN-BASED DETECTION USING DATA INJECTION

This application is a continuation of U.S. patent application Ser. No. 14/133,545, filed Dec. 18, 2013, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing pattern-based detection using data injection are described. Using the systems and methods described herein, specific data values may be injected into a distributed system that implements a service-oriented architecture. Service requests, potentially including the specific data values, may be supplied to services in the distributed system. Interactions between services (including service requests) may be monitored by the individual services, and data and/or metadata (e.g., parameter names and/or parameter values) included in a service interaction may be compared to a set of patterns configured to match the specific data values. If a match is found with any of the patterns, the match may be reported to a data analyzer. The data analyzer may build a call graph or perform any other suitable technique to analyze and/or visualize the flow of the specific data values. In this manner, services that process or store particular types of data (e.g., sensitive data) may be identified, and changes to the services over time may also be identified.

Figure 1:
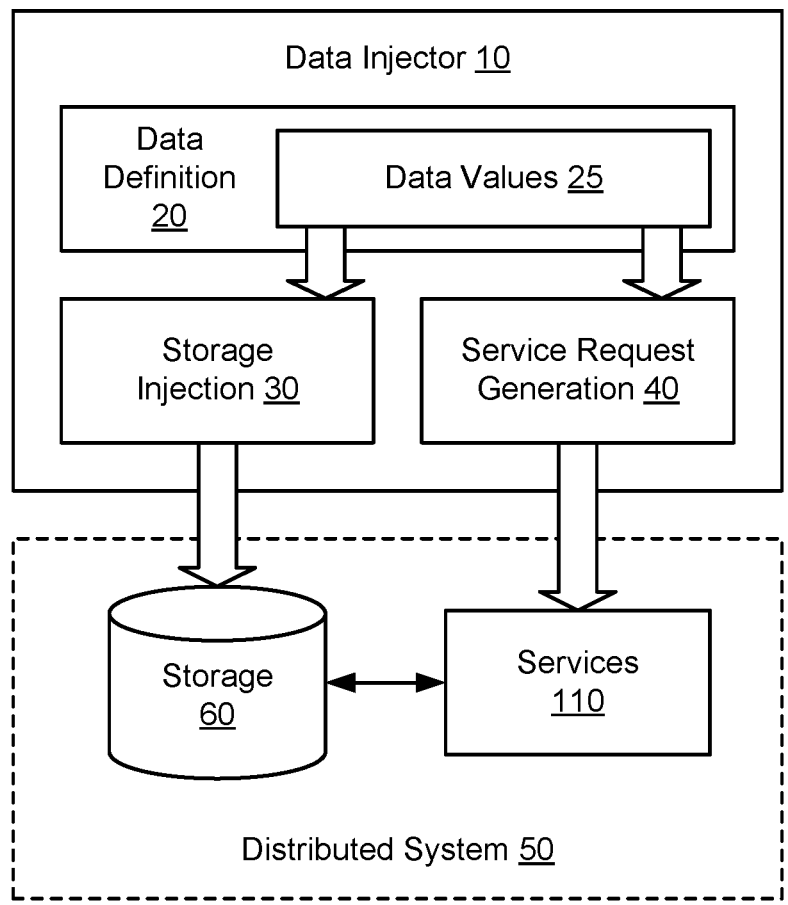
FIG. 1 illustrates an example system environment for data injection, according to some embodiments.

FIG. 1 illustrates an example system environment for data injection, according to some embodiments. The example system environment may include a data injector 10 and a distributed system 50. Using the systems and methods described herein, the data injector 10 may define specific data values and provide the specific data values to components of the distributed system 50 in various ways. As will be described in greater detail below, the use of the specific data values may then be detected using service instrumentation.

The data injector 10 may include a plurality of components configured for defining and injecting data values into the distributed system 50. In one embodiment, the data injector may include a data definition functionality 20, a storage injection functionality 30, and a service request generation functionality 40. The data injector may be implemented using one or more computing devices, any of which may be implemented by the example computing device 3000 illustrated in FIG. 14. In various embodiments, the functionality of the different services, components, and/or modules of the data injector 10 (e.g., the data definition functionality 20, storage injection functionality 30, and service request generation functionality 40) may be provided by the same computing device or by different computing devices. If any of the various components are implemented using different computing devices, then the respective computing devices may be communicatively coupled, e.g., via a network. The data injector 10 and its individual components may represent any combination of software and hardware usable to perform their respective functions, as discussed as follows.

In one embodiment, the distributed system 50 may include storage resources 60 and a plurality of services 110. The distributed system 50 may include a plurality of computing devices, any of which may be implemented by the example computing device 3000 illustrated in FIG. 14. The storage resources 60 may include any suitable number of storage components, and the storage components may differ in type and/or configuration. The storage resources 60 may include persistent storage resources (e.g., disk drives, block storage, databases, data repositories, etc.) and/or volatile storage resources. Elements of the distributed system 50 may be communicatively coupled to other elements, e.g., via a network.

Using the data definition functionality 20, the data injector 10 may define specific data values 25 for use in the distributed system 50. The data values 25 may be defined manually (e.g., with direct user intervention), automatically (e.g., without direct user intervention), or a combination thereof. The data values 25 may be defined using any suitable techniques. For example, at least a portion of the data values 25 may be generated based on the capture of real-world transactions in the distributed system 50. Accordingly, at least a portion of the data values 25 may represent real-world data used within the distributed system 50. Alternatively, at least a portion of the data values 25 may be generated synthetically. Elements of the data values 25 may be associated with corresponding data fields. For example, an e-mail address in the data values 25 may be associated with an e-mail address field that is used by one or more of the services 110. A data value associated with a particular data field may be defined such that it conforms to any applicable standard(s) for the data field. For example, an e-mail address defined in the data values 25 may be a string that appears to be a well-formed e-mail address, even though the address (i.e., the username and/or domain) may be invalid in practice. The data values 25 may be highly specific or even unique for a given data field within the distributed system 50. In one embodiment, a defined data value may include a string that may be pattern-matched as well as one or more metadata values that identify, for example, the location or endpoint at which the data value was injected into the distributed system 50.

The data values 25 may be provided to the distributed system 50 in various ways. In one embodiment, the storage injection functionality 30 may inject individual data values into various storage locations in the storage resources 60. In one embodiment, the storage injection functionality 30 may store elements of the data values 25 in various databases and/or data repositories that are implemented using the storage resources 60. For example, the storage injection functionality 30 may insert an e-mail address defined using the data definition functionality 20 into an appropriate location in a customer database and/or ordering database in the storage resources 60. The storage locations at which the defined data values are injected may represent various levels or portions of the distributed system 50, including front-end systems, back-end systems, etc. In one embodiment, the storage injection functionality 30 may be configured to interact with any suitable component of the storage resources 60, e.g., using an application programming interface (API) for the component to cause the component to store the defined data values. In one embodiment, the storage injection functionality 30 may automatically inject individual data values into various storage locations. In one embodiment, the storage injection functionality 30 may inject individual data values into various storage locations based on manual intervention by a user.

In one embodiment, the service request generation functionality 40 may generate requests to be handled by individual services 110. A service request generated by the service request generation functionality 40 may instruct a relevant one of the services 110 to perform one or more tasks. Some of the service requests may cause a recipient service to pass one or more additional service requests to one or more additional services. Services are described in greater detail below, e.g., with respect to FIG. 2. In one embodiment, service requests generated using the service request generation functionality 40 may include elements of the data values 25 defined using the data definition functionality 20. In one embodiment, service requests generated using the service request generation functionality 40 may not include elements of the data values 25 defined using the data definition functionality 20. However, the service requests that do not include elements of the data values 25 may cause the services 110 to load elements of the data values 25 from the storage resources 60; the services may then pass the retrieved elements of the data values 25 to other services using additional requests or responses. In one embodiment, the service request generation functionality 40 may automatically generate the service requests. In one embodiment, the service request generation functionality 40 may generate service requests based on manual intervention by a user.

Figure 2:
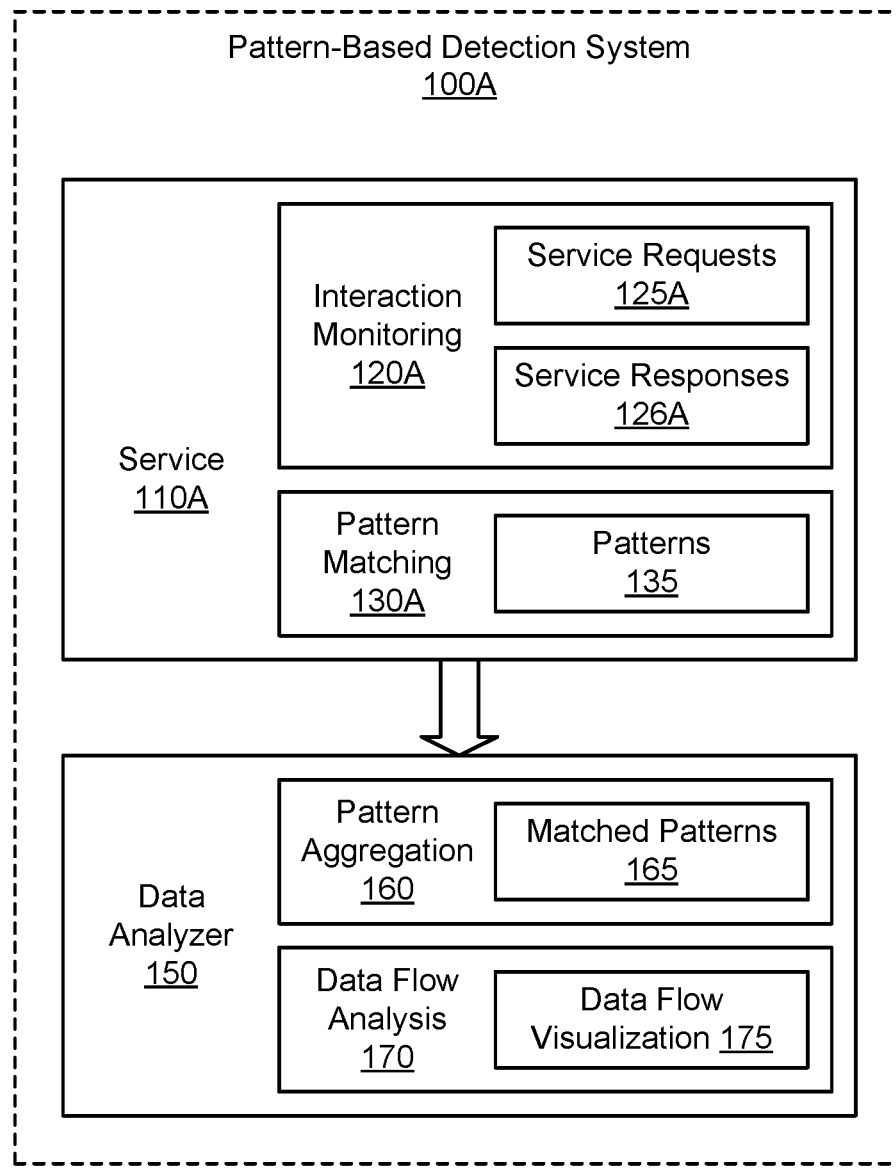
FIG. 2 illustrates an example system environment for pattern-based detection, according to some embodiments.

FIG. 2 illustrates an example system environment for pattern-based detection, according to some embodiments. The example system environment may include a pattern-based detection system 100A. The pattern-based detection system 100A may include a plurality of components configured for monitoring interactions between services and determining which of the services process or store data that matches particular patterns. For example, the pattern-based detection system 100A may include at least one service 110A and a data analyzer 150. The service 110A may represent an example of the services 110; accordingly, the service 110A may be part of the distributed system 50.

Figure 14:
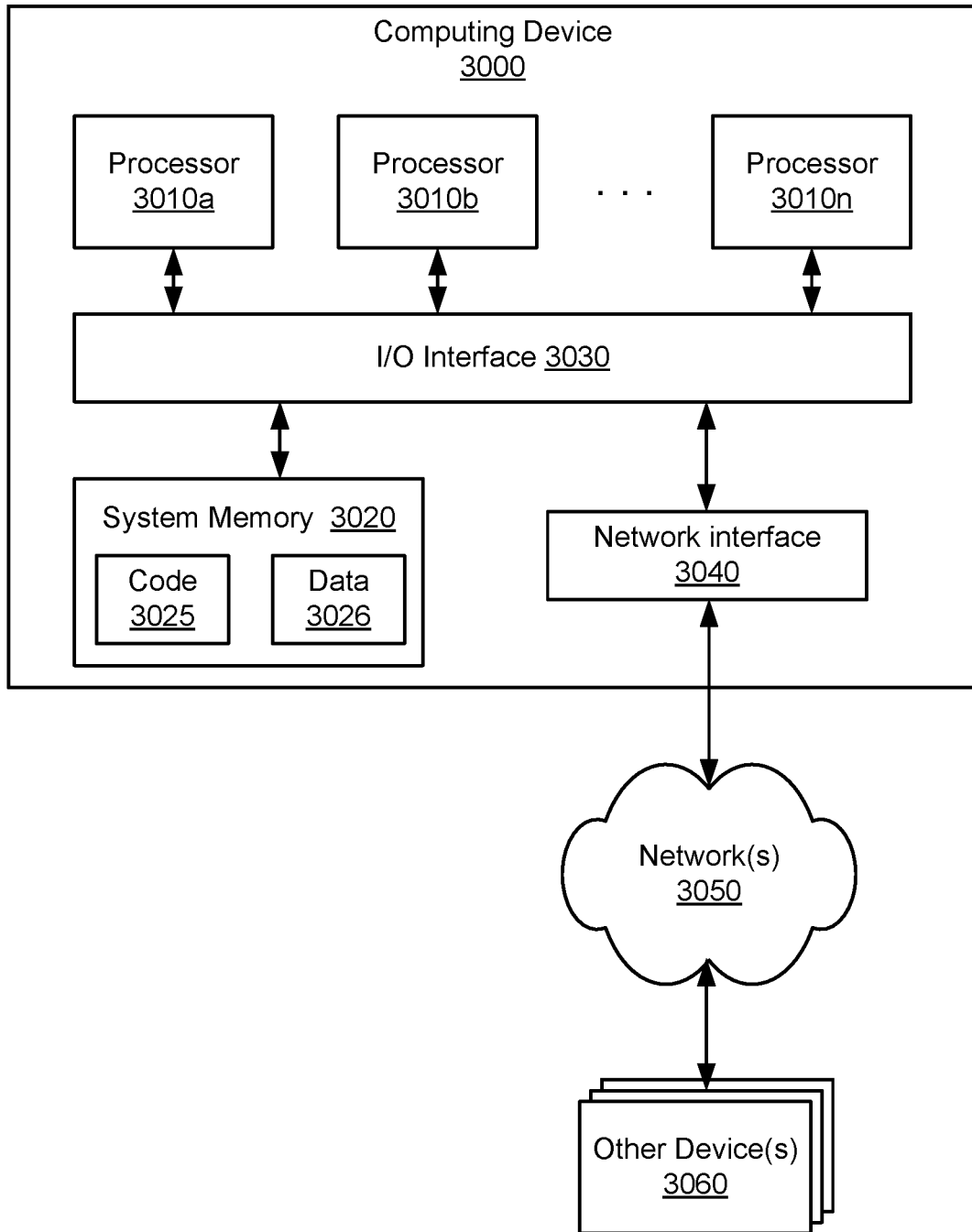
FIG. 14 illustrates an example of a computing device that may be used in some embodiments.

The pattern-based detection system 100A may include one or more computing devices, any of which may be implemented by the example computing device 3000 illustrated in FIG. 14. In various embodiments, the functionality of the different services, components, and/or modules of the pattern-based detection system 100A, including the service 110A and the data analyzer 150 as well as their individual components, may be provided by the same computing device or by different computing devices. If any of the various components are implemented using different computing devices, then the respective computing devices may be communicatively coupled, e.g., via a network. Each of the service 110A and the data analyzer 150, along with their individual components, may represent any combination of software and hardware usable to perform their respective functions, as discussed as follows.

The service 110A may include an interaction monitoring functionality 120A. The interaction monitoring functionality 120A may monitor or track interactions between the service 110A and other services (or components of services) in a service-oriented system, such as a system structured according to a service-oriented architecture (SOA). A service-oriented architecture may include multiple services configured to communicate with each other (e.g., through message passing) to carry out various tasks, such as business process functions. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes. The monitored interactions may include service requests 125A (i.e., requests for services to be performed, e.g., by the service 110A), responses 126A to requests, and other suitable events. The monitored interactions may include the service requests generated using the service request generation functionality 40 as well as any subsequent requests generated for downstream services.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, the interaction monitoring functionality 120A may monitor service interactions such as service requests 125A and service responses 126A in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions. Running the pattern-based detection system 100A in a test environment may include injecting particular data values into service requests in order to identify services that process the injected data.

To monitor the service requests 125A and responses 126A, lightweight instrumentation may be added to services, including service 110A. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A are discussed below with respect to FIGS. 8-13.

The service 110A may also include a pattern matching functionality 130A. The pattern matching functionality 130A may compare suitable portions of the service interactions (e.g., the service requests 125A and/or responses 126A) against a set of patterns 135. The portions of the service requests 125A (or other suitable service interactions) may include, for example, parameter values and/or parameter names, as well as any other data or metadata that may include data of interest to the pattern matching functionality 130A. The patterns may include, for example, strings and/or regular expressions. At least a portion of the patterns may be configured to match individual elements of the defined data values 25. For example, a pattern corresponding to a defined data value may include all or part of the characters or values in the defined data value and potentially one or more wildcard operators. If any matches are found, the service 110A may report the matches to the data analyzer 150. Further aspects of a service that performs a pattern-matching operation are discussed with respect to FIG. 4.

Turning back to FIG. 2, the data analyzer 150 may include a pattern aggregation functionality 160. Using the pattern aggregation functionality 160, the data analyzer 150 may receive data relating to matched patterns from services including the service 110A, including matched patterns for elements of the defined data values 25. All the data received from the services may be stored as matched patterns 165. The matched patterns 165 may indicate, for each match, the pattern that was matched. The matched patterns 165 may also indicate, for each match, additional information such as the data that matched the pattern, data identifying the service that received the request and found the match (including the service name, the service instance, etc.), data identifying the service that sent the request (including the service name, the service instance, etc.), any additional data or metadata associated with the relevant service request, an application programming interface (API) that was invoked to send the service request, and/or any other information suitable for identifying services that process or store particular elements of data or types of data.

The data analyzer 150 may include a data flow analysis functionality 170. The data flow analysis functionality 170 may analyze the matched patterns 165 and generate suitable reports and/or visualizations based on the matched patterns 165. For example, a report generated by the data flow analysis functionality 170 may indicate the identities of the services that process data matching a particular pattern, along with other relevant information. As another example, a data flow visualization 175 generated by the data flow analysis functionality 170 may show the connections between services that process or store data that matches a particular pattern. In one embodiment, a defined data value may include a string that may be pattern-matched as well as one or more metadata values that identify, for example, the location or endpoint at which the data value was injected into the distributed system 50. Accordingly, the data flow analysis functionality 170 may receive this data and identify the point (e.g., storage location, service, etc.) at which a defined data value was injected into the distributed system. Reports or visualizations may be generated based on queries submitted by users, where the queries may indicate, for example, a pattern or corresponding type of data to be reported on or visualized.

In this manner, the pattern-based detection system 100A may identify services that process or store particular types of data, including particular elements of the defined data values 25. In one embodiment, the particular types of data may include "sensitive" data, i.e., data whose security is important. Types of sensitive data may include, for example, financial data or payment data (e.g., credit card numbers, gift card identifiers, etc.), personal identification data (e.g., Social Security numbers), e-mail address data, physical address data, etc. In one embodiment, the detected data may include one or more specific data values that are not expected to be seen at a particular service. In one embodiment, using appropriate patterns, the pattern-based detection system 100A may identify services that process or store data that should be encrypted but that is processed or stored in an insufficiently secure (e.g., plaintext) format. In one embodiment, the pattern-based detection system 100A may identify services that process or store types of data that the services should not be authorized to handle. In this manner, the pattern-based detection system 100A may be used to identify potential security breaches in a distributed, service-oriented system. Additionally, the pattern-based detection system 100A may also be used to identify services that are not functioning as expected. It is contemplated that the techniques described herein may be used to identify services in a distributed, service-oriented system that process and/or store substantially any particular type or value of data.

In one embodiment, the pattern-based detection system 100A may identify services that do not process or store particular types of data. Using similar techniques as those described above, the pattern matching functionality 130A may identify and report services in which a particular pattern is missing from the data and/or metadata associated with a service request. In this manner, the pattern-based detection system 100A may be used to identify services that are not functioning as expected.

In one embodiment, all or nearly all of the service requests 125A may be processed using the pattern matching functionality 130A. In one embodiment, however, only a subset of the service interactions (e.g., the service requests 125A and/or responses 126A) may be processed using the pattern matching functionality 130A. Any suitable technique may be used to identify which of the service interactions (e.g., the service requests 125A and/or responses 126A) to search for the patterns 135. In one embodiment, probabilistic sampling techniques may be used to initiate the pattern-matching operation for a certain percentage (e.g., 1%) of all service interactions. In one embodiment, the pattern-matching operation may be enabled on an interaction-by-interaction basis, such as by including one or more bits in a request identifier or trace identifier that instruct the service to enable pattern-matching for a particular interaction.

Figure 3:
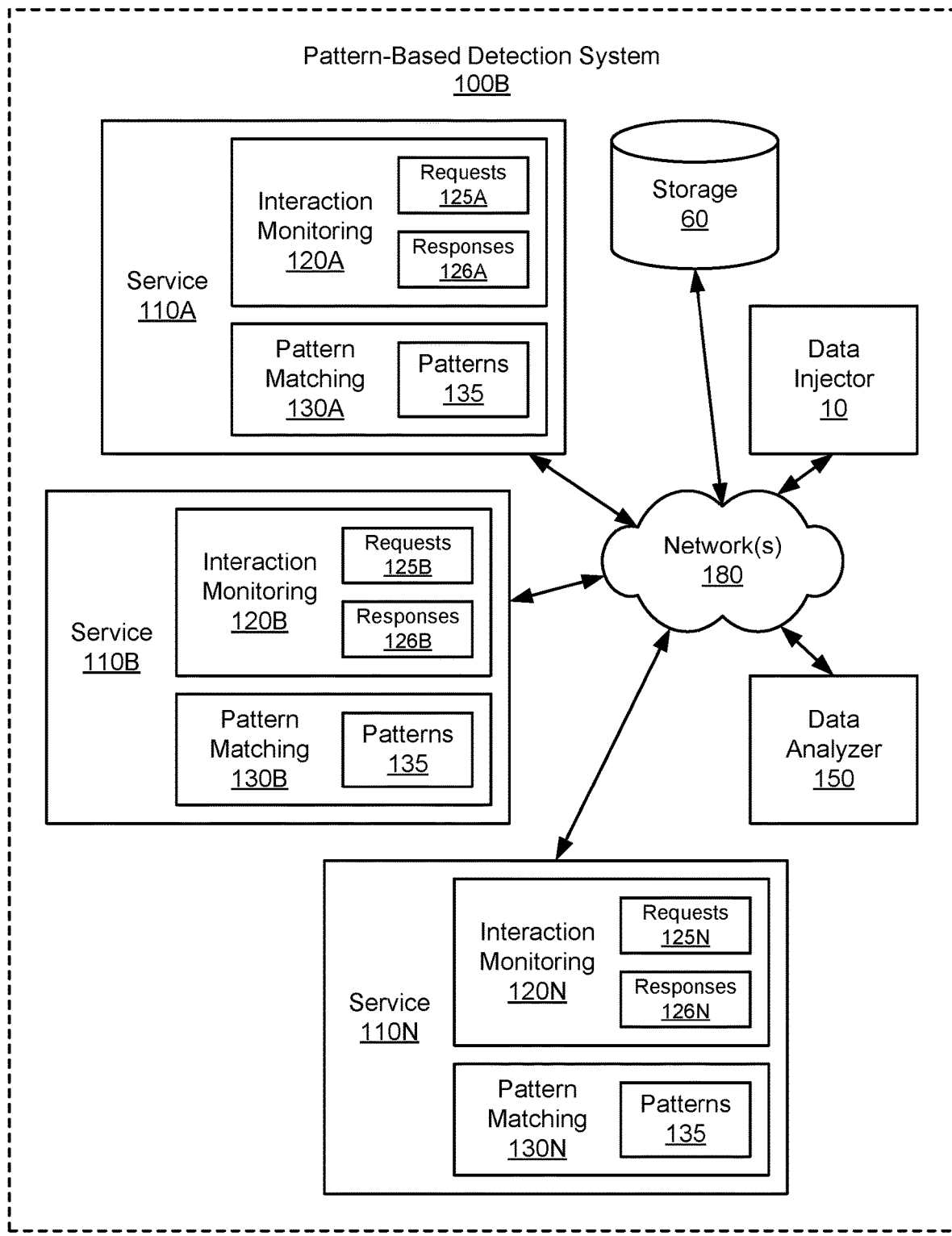
FIG. 3 illustrates further aspects of an example system environment for pattern-based detection using data injection, according to some embodiments.

FIG. 3 illustrates further aspects of an example system environment for pattern-based detection using data injection, according to some embodiments. As discussed above with respect to FIG. 1, a data injector 10 may inject defined data values into storage resources 50 and/or service requests for any of services 110A-110B. A plurality of different services may independently perform the interaction monitoring and pattern-matching operations and provide pattern matching data to the data analyzer 150. As shown in the example of FIG. 3, the pattern-based detection system 100B may include services 110A, 110B, and 110N. However, it is contemplated that the pattern-based detection system 100B may include different numbers of services and different configurations of services. The services 110A, 110B, and 110N may be coupled to each other and to the storage resources 50, data injector 10, and data analyzer 150 via one or more network(s) 180 (e.g., the Internet, one or more LANs, etc.).

In one embodiment, the services 110A, 110B, and 110N, the data injector 10, and the data analyzer 150 collectively may be implemented using one or more computing devices, such that individual ones of the services may be implemented using different computing devices than others of the services. The computing devices may include virtual computing devices, multiples ones of which may run on the same underlying computing hardware. Accordingly, multiple ones of the services 110A-110N, the data injector 10, and the data analyzer 150 may be implemented using different instances of virtual machines on the same physical machine. Each of the virtual computing devices may be configured to communicate with other virtual computing devices and/or physical computing devices over the network(s) 180, even if the virtual computing devices in communication are hosted on the same underlying hardware.

The additional services 110B and 110N may perform similar functions as described above with respect to service 110A. In one embodiment, the service 110B may include an interaction monitoring functionality 120B that monitors interactions such as service requests 125B and responses 126B processed by the service 110B. The service 110B may also include a pattern matching functionality 130B that compares suitable portions of the service requests 125B against a set of patterns 135. In one embodiment, the service 110N may include an interaction monitoring functionality 120N that monitors interactions such as service requests 125N and responses 126N processed by the service 110N. The service 110N may also include a pattern matching functionality 130N that compares suitable portions of the service requests 125N against a set of patterns 135. The interaction monitoring functionality 120B and the interaction monitoring functionality 120N may be implemented in substantially the same manner as the interaction monitoring functionality 120A described above. The pattern matching functionality 130B and the pattern matching functionality 130N may be implemented in substantially the same manner as the pattern matching functionality 130A described above.

In one embodiment, the same set of patterns 135 may be used by more than one of the services (e.g., services 110A, 110B, and 110N). However, it is contemplated that different services may also have different sets of patterns, e.g., based on the types of data that the services tend to process and/or store. The patterns 135 may be promulgated to the various services and kept up-to-date using any suitable techniques. As discussed above, at least some of the patterns 135 may be configured to match particular ones of the defined data values 25.

Figure 4:
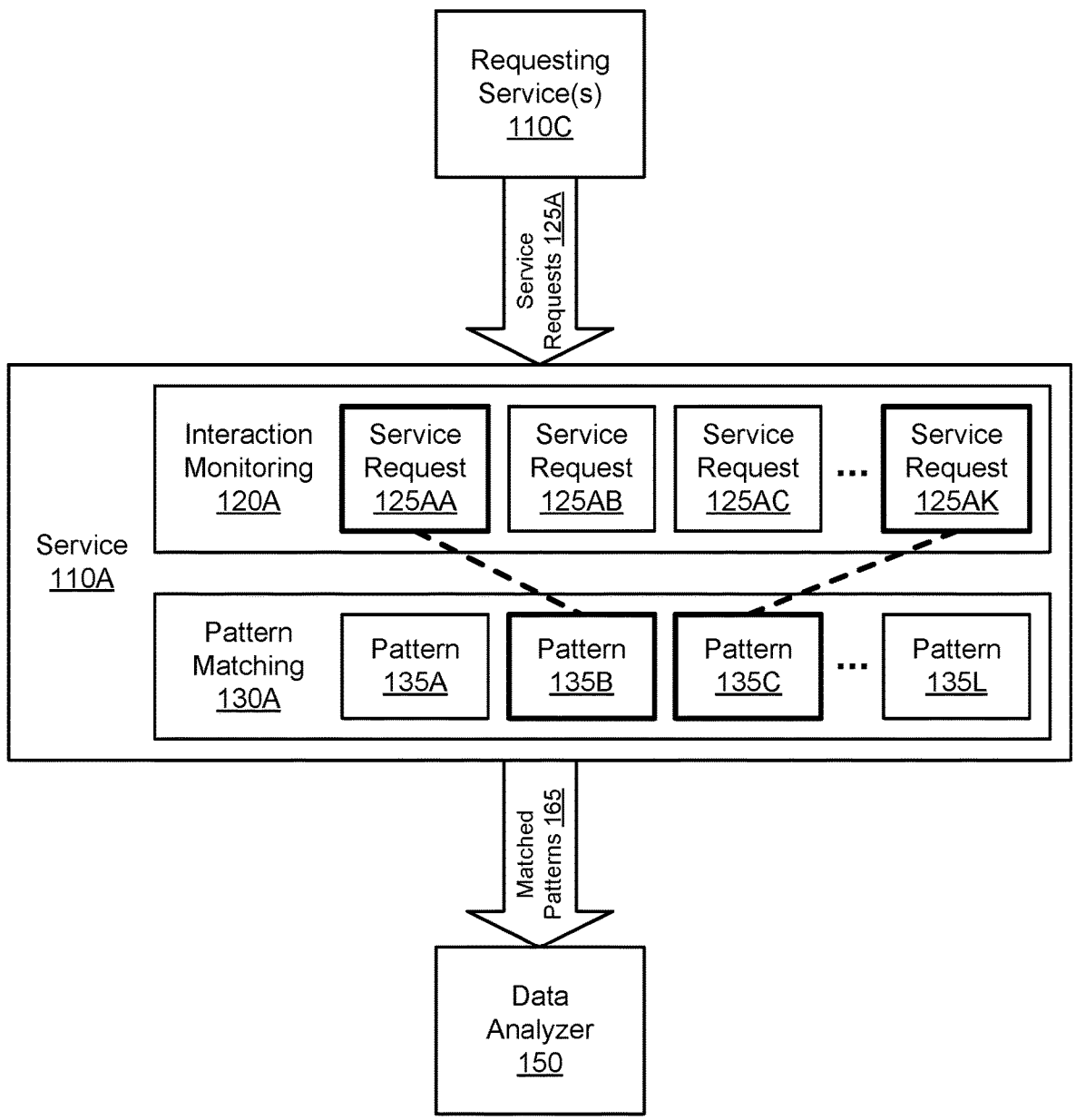
FIG. 4 illustrates a service configured for pattern-based detection, according to some embodiments.

FIG. 4 illustrates further aspects of a service configured for pattern-based detection, according to some embodiments. In one embodiment, the service 110A may receive the service requests 125A from one or more requesting services 110C and/or from the data injector 10. The service requests 125A may include a series of service requests received by the service 110A at one or more times, such as service request 125AA, service request 125AB, service request 125AC, and service request 125AK. The service requests 125AA, 125AB, 125AC, and 125AK are shown for purposes of example, and it is contemplated that different numbers of service requests may be received. The pattern matching functionality 130A may store or otherwise have access to a set of patterns 135, including a pattern 135A, a pattern 135B, a pattern 135C, and a pattern 135L. The patterns 135A, 135B, 135C, and 135L are shown for purposes of example, and it is contemplated that different numbers of patterns may be maintained. In one embodiment, the patterns may be specific and not necessarily comprehensive in order to detect the presence of most, but not necessarily all, instances of a particular type of sensitive data. In one embodiment, the patterns may be defined in such a way as to detect the presence of particular elements of the defined data values 25.

In one embodiment, data or metadata in the service requests 125A and/or other service interactions may undergo various types of processing before being subjected to the pattern matching operation. For example, the data or metadata may be decompressed, decrypted, or deserialized, etc., upon receipt by the service 110A. The results of such operations may be placed in a memory managed by the service 110A. Accordingly, the pattern matching functionality may be performed using data or metadata in the memory context of the service 110A (e.g., data or metadata that has been decompressed, decrypted, or deserialized) rather than the unprocessed data or metadata received as part of the service interaction.

In one embodiment, the pattern matching functionality 130A may compare suitable portions of each of the service requests 125AA, 125AB, 125AC, and 125AK against each of the patterns 135A, 135B, 135C, and 135L. If any matches are found, the service 110A may report the matched patterns 165 to the data analyzer 150. As shown in the example of FIG. 4, a match may be found for service request 125AA and pattern 135B. Similarly, a match may be found for service request 125AK and pattern 135C. In this example, no matches may be found against any of the patterns for the contents of service request 125AB and service request 125AK.

The portions of the service requests or other input elements that are examined for a potential match may include parameter values, parameter names, and/or any other suitable data or metadata associated with a service interaction. The patterns may include strings, regular expressions, and/or other suitable expressions. For example, service request 125AA may include a parameter having a parameter name such as "e-mail" and a parameter value of an e-mail address. The pattern 135B that matches the service request 125AA may include a string such as "e-mail" or "email" that is matched against the parameter name or a regular expression (e.g., "^[a-zA-Z0-9_.+-]+@[a-zA-Z0-9-]+\.[a-zA-Z0-9-.]+$") that is matched against a seemingly valid e-mail address in the parameter value. In one embodiment, the same service request 125AA may match multiple patterns, such as patterns for both the e-mail address parameter name and the actual e-mail address in the parameter value.

As another example, service request 125AK may include a parameter having a parameter name such as "credit card number" and a parameter value of a credit card number. The pattern 135C that matches the service request 125AK may include a string such as "credit card" that is matched against the parameter name or a regular expression (e.g., indicating a sixteen-digit number whose last digit is a valid Luhn-10 checksum) that is matched against a seemingly valid MasterCard or VISA account number in the parameter value. In one embodiment, the same service request 125AK may match multiple patterns, such as patterns for both the credit card parameter name and the actual credit card number in the parameter value.

In one embodiment, a pattern match may be reported along with a confidence level for the match. The confidence level may be refined by the ratio of matching to non-matching requests processed at a particular service. The confidence level may be reported by the data flow analysis functionality 170. The confidence level may also be used by the data flow analysis functionality 170 in generating the data flow visualization 175, e.g., using any suitable visual techniques to depict various confidence levels in a visualization of the flow of sensitive data.

Figure 5:
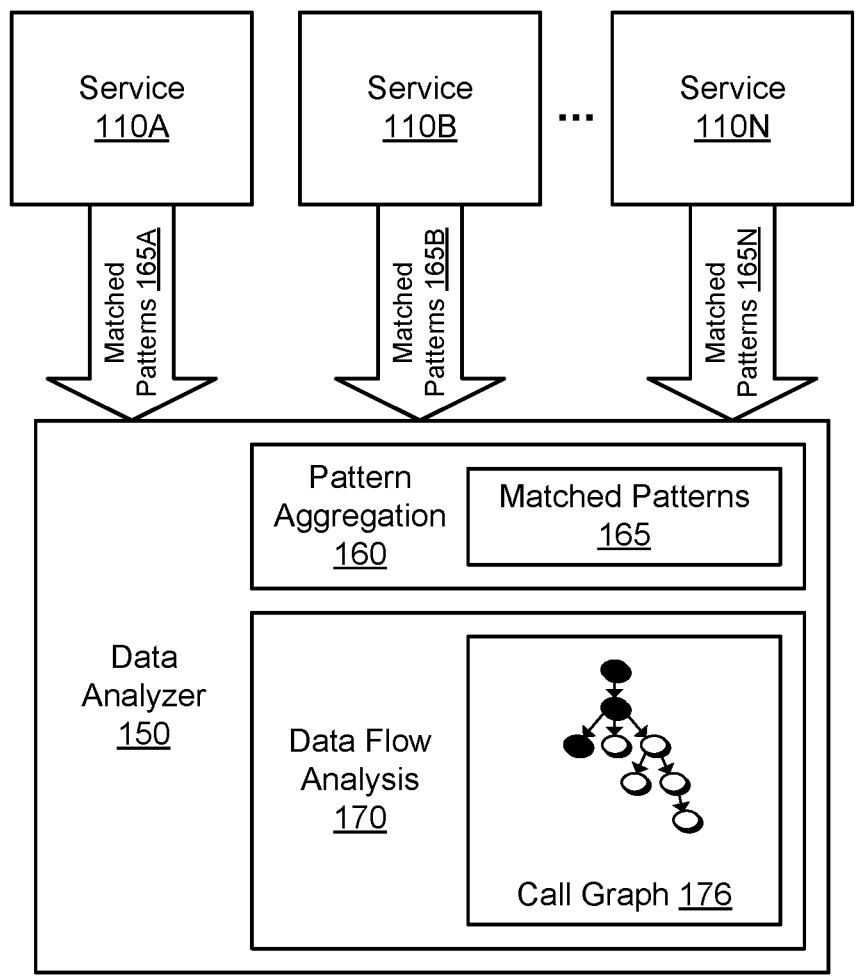
FIG. 5 illustrates a data analyzer configured for data flow visualization, according to some embodiments.

FIG. 5 illustrates further aspects of a data analyzer configured for data flow analysis and visualization, according to some embodiments. As discussed above, if the data in a service interaction matches a pattern, the corresponding service may record which pattern was matched and include that data in the matched pattern data 165 sent to the data analyzer 150. The matched patterns 165 may include matched patterns 165A from multiple services, such as matched patterns 165A from service 110A, matched patterns 165B from service 110B, and matched patterns 165N from service 110N. The services 110A, 110B, and 110N and their corresponding matched patterns 165A, 165B, and 165N are shown for purposes of example, and it is contemplated that different numbers and combinations of services and matched patterns may be used.

The data analyzer 150 may include a data flow analysis functionality 170 that generates reports and/or visualization data, such as data relating to a flow of the data that matches a pattern through a service-oriented architecture. As shown in the example of FIG. 5, the data flow analysis functionality 170 may generate one or more call graphs 176 for each data flow. The call graph 176 may represent the flow of requests from service to service and may identify service dependencies. The call graph 176 may identify the services that handle the data that matches the pattern, and the call graph 176 may depict the flow of requests involving the data that matches the pattern. For example, as shown in the example call graph

176, three services that handle data that matches a particular pattern are shown as darkened nodes. Using the reports and/or visualizations, a user of the pattern-based detection system 100A or 100B may determine which services handle particular types of data (e.g., elements of the defined data values 25, sensitive data, data that is insufficiently secure, etc.). The user may then take any suitable action based on the detected patterns, such as corrective action to mitigate security breaches (including potential breaches). In one embodiment, the data flow analysis functionality 170 may generate alerts or alarms, e.g., upon detecting the presence of particular elements of data or particular data types. The conditions resulting in the alerts or alarms may be configured by a user.

The reports and/or visualization data may be generated based on the matched patterns 165 received from the various services. The matched patterns 165 may include or be received along with connectivity data that is usable to generate the nodes and edges in the call graph 176. The connectivity data may be gathered using the interaction monitoring functionality (e.g., functionality 120A of service 110A). Accordingly, the interaction monitoring functionality for the various services in the call graph 176 may collect data indicative of service interactions involved in satisfying a particular initial request, e.g., data indicative of a route taken in satisfying a service request and/or a hierarchy of call pathways between services. The route may correspond to a set of call pathways between services. The call pathways may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph 176 that specifies, for each particular service of multiple services called to fulfill the same root request, the service that called the particular service and any services called by the particular service. A call graph 176 may include a hierarchical data structure that include nodes representing the services and edges representing the interactions. In some cases, a call graph 176 may be a deep and broad tree with multiple branches each representing a series of related service calls. The data flow analysis functionality 170 may use any suitable data and metadata to build call graph, such as request identifiers and metadata associated with services and their interactions. The request identifiers and metadata are discussed below with respect to FIGS. 8-13.

The generation of a particular call graph may be initiated based on any suitable determination. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within minutes. As another example, a root request to fulfill and ship a product order may be expected to be completed within days or weeks; accordingly, the call graph may be finalized within weeks or even months.

Figure 6:
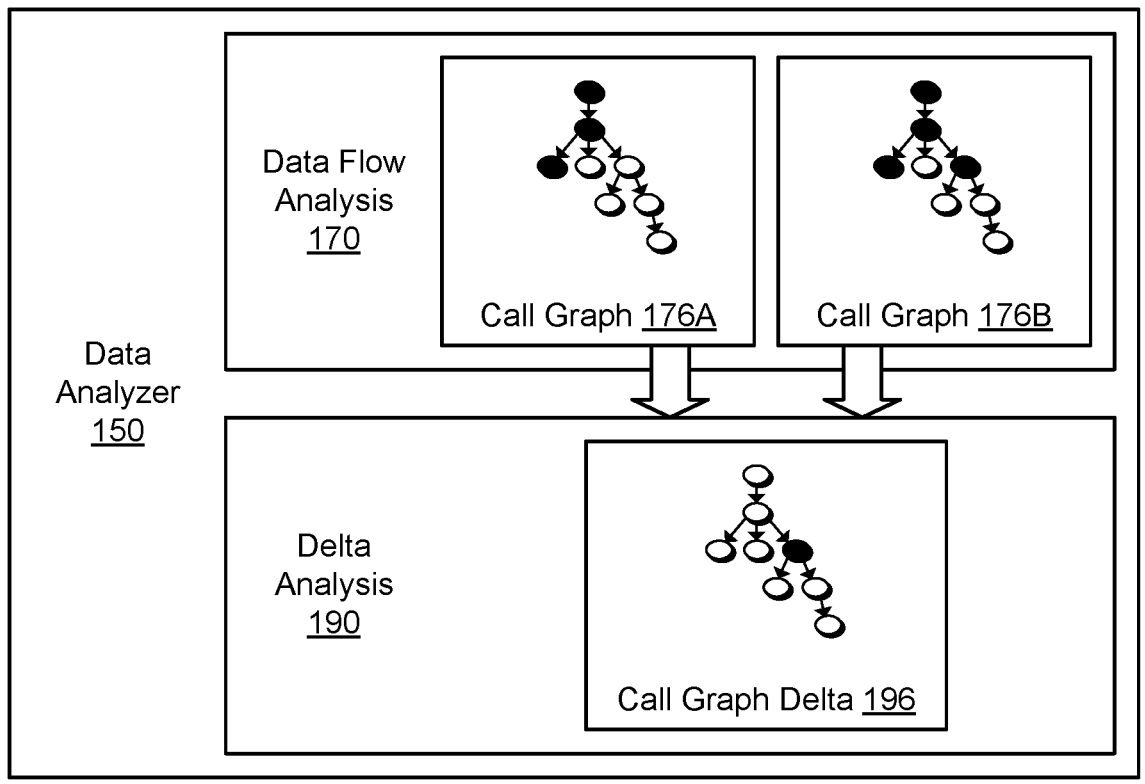
FIG. 6 illustrates a data analyzer configured for comparing two sets of data flows, according to some embodiments.

FIG. 6 illustrates a data analyzer configured for comparing two sets of data flows, according to some embodiments. As discussed above, the data analyzer 150 may include a data flow analysis functionality 170 that generates call graphs based on trace data for matched patterns. As shown in the example of FIG. 6, the data flow analysis functionality 170 may generate a first call graph 176A and a second call graph 176B. However, it is contemplated that the data flow analysis functionality 170 may generate any suitable number of call graphs (or other data flow visualizations or analyses) at any suitable times. A delta analysis functionality 190 may be configured to compare the call graphs (or other data flow visualizations or analyses) and generate information indicative of the differences between them. In various embodiments, the output of the delta analysis functionality 190 may include another call graph, a report, or any suitable data indicating the differences between two or more call graphs (or other data flow visualizations or analyses). For example, as shown in FIG. 6, the delta analysis functionality 190 may generate a call graph delta 196 in which changes (e.g., nodes that differ in the comparison) are highlighted. In one embodiment, the delta analysis may be configured to generate an alarm if particular changes are found.

In one embodiment, the data flow analysis functionality 170 may generate call graphs representing the flow of data in a set of services at different points in time or at different windows of time. Accordingly, the call graph 176A may represent the flow of a defined data value at a first point in time or window of time, and the call graph 176B may represent the flow of a defined data value through the same set of services at a second point in time or window of time. The call graph delta 196 may thus indicate a difference between the two points in time or two windows of time.

In one embodiment, the data flow analysis functionality 170 may generate call graphs representing the flow of data in a set of services in two different environments, including any suitable number of test environments and/or any suitable number of production environments. Accordingly, the call graph 176A may represent the flow of a defined data value in a first environment, and the call graph 176B may represent the flow of a defined data value through the same set of services in a second environment. The call graph delta 196 may thus indicate a difference between the two environments.

In one embodiment, the delta analysis functionality 190 (or any other suitable component of the data analyzer 150) may compare information indicative of the flow of a particular data value or data type to information in a service registry. The service registry may include information indicating which services use or have the rights to use particular types of data. If the data analyzer 150 finds a disparity between the data actually used by a service (as determined using the pattern-matching functionality of the service) and the information in the service registry for the service, then appropriate measures may be taken. In one embodiment, an alarm and/or report may be generated to indicate the presence of incorrect, incomplete, or out-of-date information in the service registry.

Figure 7A:
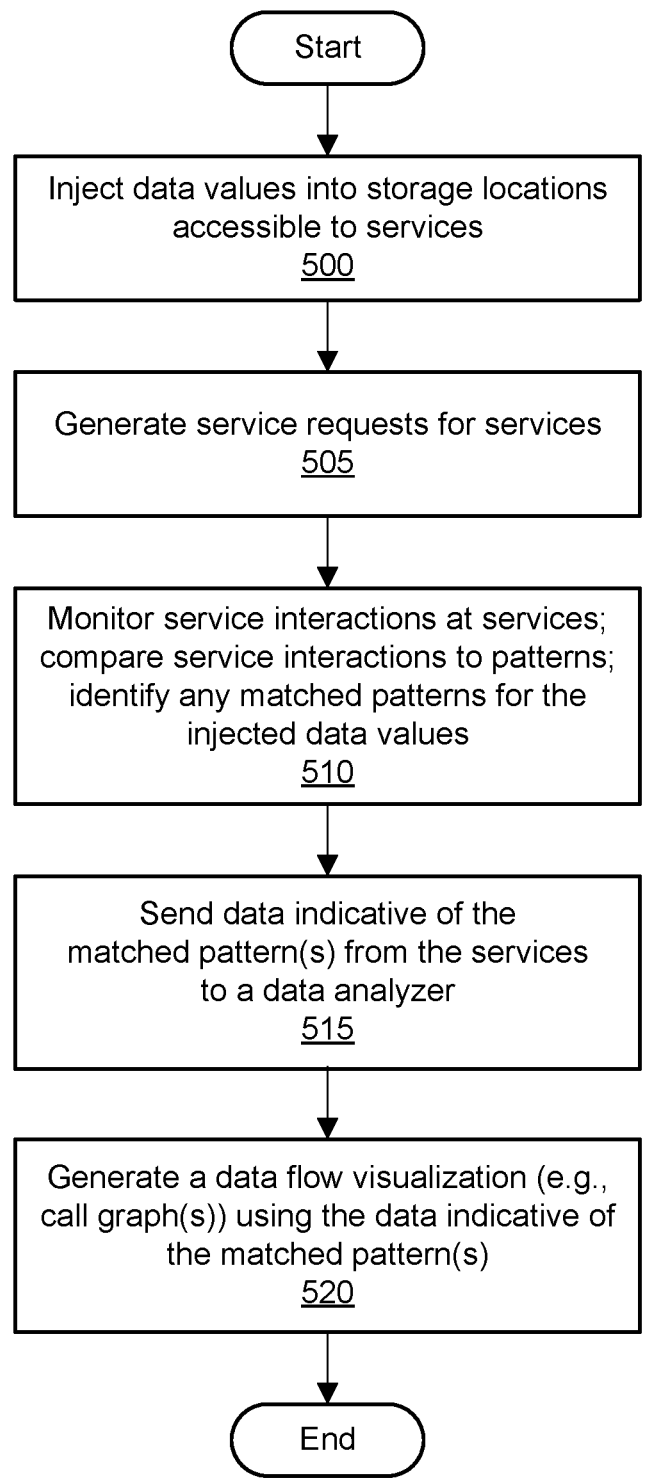
FIGS. 7A and 7B are flowcharts illustrating methods for pattern-based detection using data injection, according to some embodiments.

FIG. 7A is a flowchart illustrating a method for pattern-based detection using data injection, according to some embodiments. As shown in 500, specific data values may be injected into various storage locations that are accessible to a set of services. As shown in 505, service requests may be generated for the services. In various embodiments, the service requests may or may not include elements of the specific data values. In one embodiment, the service requests may include any suitable metadata (referred to herein as a pattern-matching trigger) to trigger a pattern-matching operation at any properly configured service that receives the service requests. In one embodiment, the trigger metadata may be implemented using additional bits in a trace identifier or request identifier associated with the service request.

As shown in 510, one or more service interactions such as service requests may be monitored at one or more services from one or more other services. Data or metadata in the interactions such as parameters (e.g., parameter names and/or parameter values) or other input data of service requests may be compared against a set of patterns. At least a portion of the patterns may be designed to match individual elements of the specific data values. As discussed above, the patterns may include, for example, strings and/or regular expressions. Any matched patterns may be identified as a result of the comparison operation.

As shown in 515, data indicative of the matched pattern(s) may be sent from the one or more services to a data analyzer. In some embodiments, the data indicative of the matched patterns(s) may include, for each match, the identity of the matched pattern, the data that matched the pattern, data identifying the service that received the request and found the match (including the service name, the service instance, etc.), data identifying the service that sent the request (including the service name, the service instance, etc.), any additional data or metadata associated with the relevant service interaction, an application programming interface (API) that was invoked to send the service interaction, and/or any other suitable information.

As shown in 520, a data flow visualization may be generated using the data indicative of the matched pattern(s). The data flow visualization may generally indicate the presence of the specific data values in individual services. The data flow visualization may include one or more call graphs representing the flow of the data that matches each pattern throughout a hierarchy of services. Accordingly, the data flow visualization may indicate which services make use of a particular one of the specific data values.

Figure 7B:
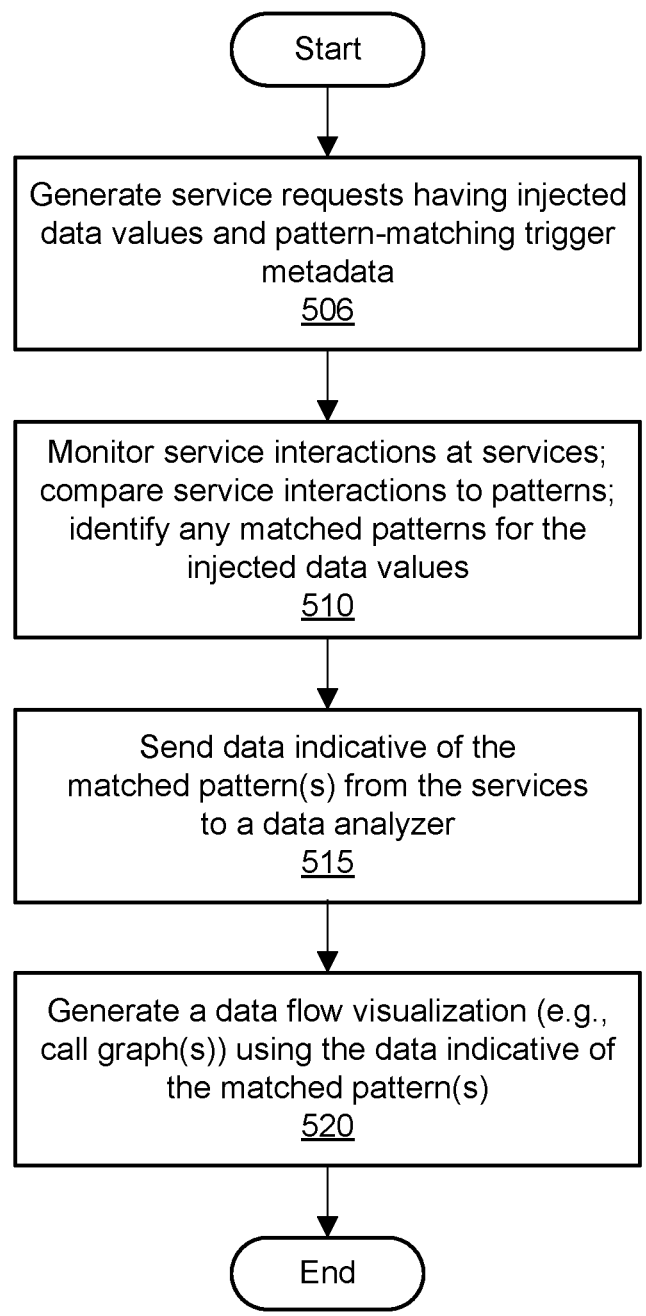

FIG. 7B is a flowchart illustrating a method for pattern-based detection using data injection, according to some embodiments. As shown in 506, service requests may be generated for a set of services. At least a portion of the service requests may include specific data values, e.g., data values defined using the data injector 10. In one embodiment, the service requests may include any suitable metadata (referred to herein as a pattern-matching trigger) to trigger a pattern-matching operation at any properly configured service that receives the service requests. In one embodiment, the trigger metadata may be implemented using additional bits in a trace identifier or request identifier associated with the service request.

As shown in 510, one or more service interactions such as service requests may be monitored at one or more services from one or more other services. Data or metadata in the interactions such as parameters (e.g., parameter names and/or parameter values) or other input data of service requests may be compared against a set of patterns. At least a portion of the patterns may be designed to match individual elements of the specific data values. As discussed above, the patterns may include, for example, strings and/or regular expressions. Any matched patterns may be identified as a result of the comparison operation.

As shown in 515, data indicative of the matched pattern(s) may be sent from the one or more services to a data analyzer. In some embodiments, the data indicative of the matched patterns(s) may include, for each match, the identity of the matched pattern, the data that matched the pattern, data identifying the service that received the request and found the match (including the service name, the service instance, etc.), data identifying the service that sent the request (including the service name, the service instance, etc.), any additional data or metadata associated with the relevant service interaction, an application programming interface (API) that was invoked to send the service interaction, and/or any other suitable information.

As shown in 520, a data flow visualization may be generated using the data indicative of the matched pattern(s). The data flow visualization may generally indicate the presence of the specific data values in individual services. The data flow visualization may include one or more call graphs representing the flow of the data that matches each pattern throughout a hierarchy of services. Accordingly, the data flow visualization may indicate which services make use of a particular one of the specific data values.

Tracking Service Requests

Various embodiments of a system and method for monitoring service requests may include a framework for tracking a series of requests that propagate through a service-oriented system, such as a system structured according to a service-oriented architecture (SOA). Such a system may include multiple services configured to communicate with each other (e.g., through message passing) to carry out various tasks, such as business process functions. In some embodiments, such services may be loosely coupled in order to minimize (or in some cases eliminate) interdependencies among services. This modularity may enable services to be reused in order to build various applications through a process referred to as orchestration.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services.

To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. For instance, a call graph may in some cases include a deep and broad tree with multiple branches each representing a series of related service calls.

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 8:
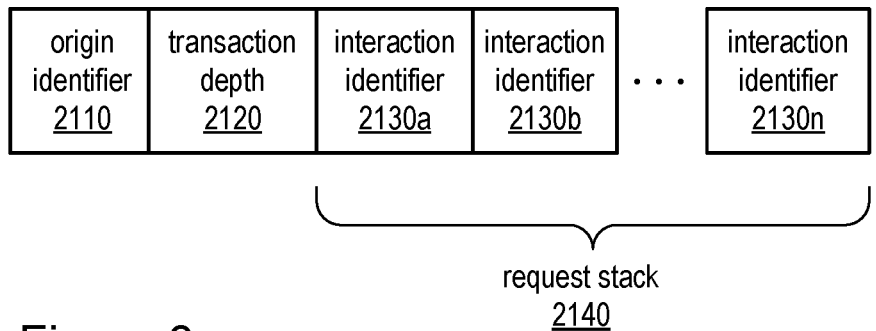
FIG. 8 illustrates an example format of a request identifier, according to some embodiments.

FIG. 8 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 8. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lower-case alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130a-2130n may represent a series of interaction identifiers in ascending chronological order (where interaction identifier 2130a corresponds to the oldest service call and interaction identifier 2130n corresponds to the most recent service call).

In addition to the illustrated elements, request identifier 2100 may in various embodiments include one or more portions of data for error detection and/or error correction. Examples of such data include but are not limited to various types of checksums.

Figure 9:
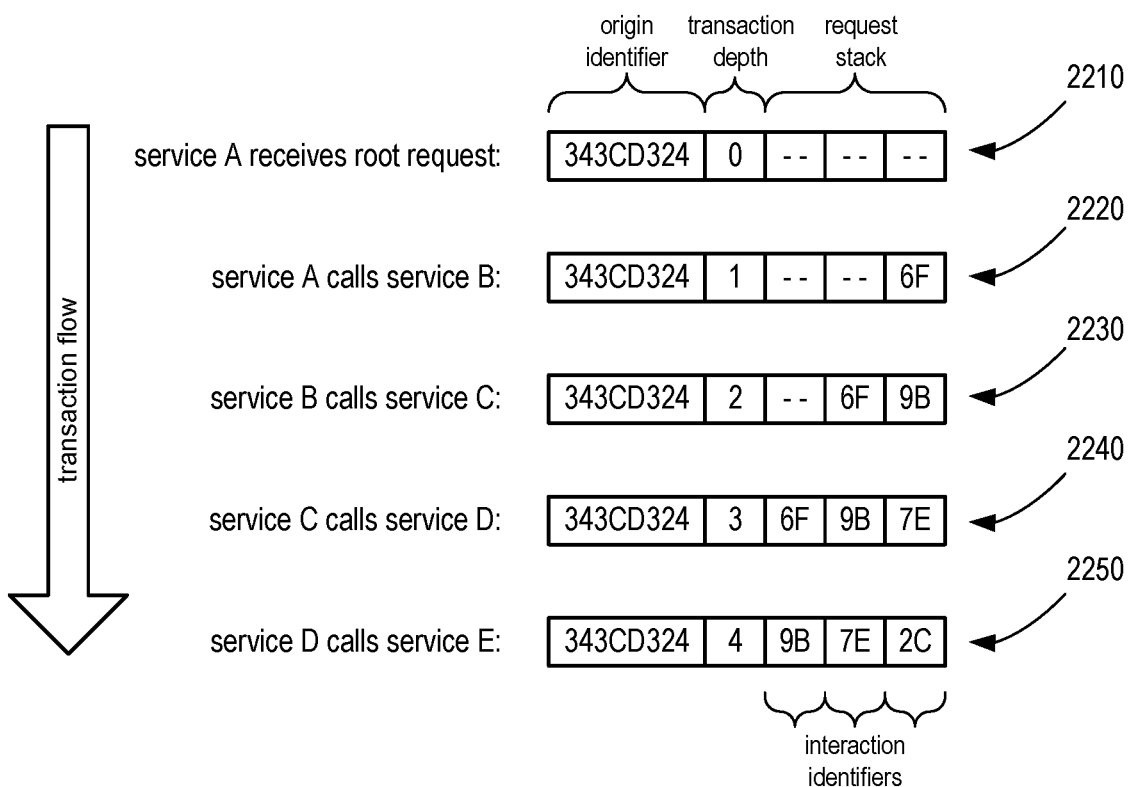
FIG. 9 illustrates an example transaction flow for fulfilling a root request, according to some embodiments.

FIG. 9 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 10). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 10:
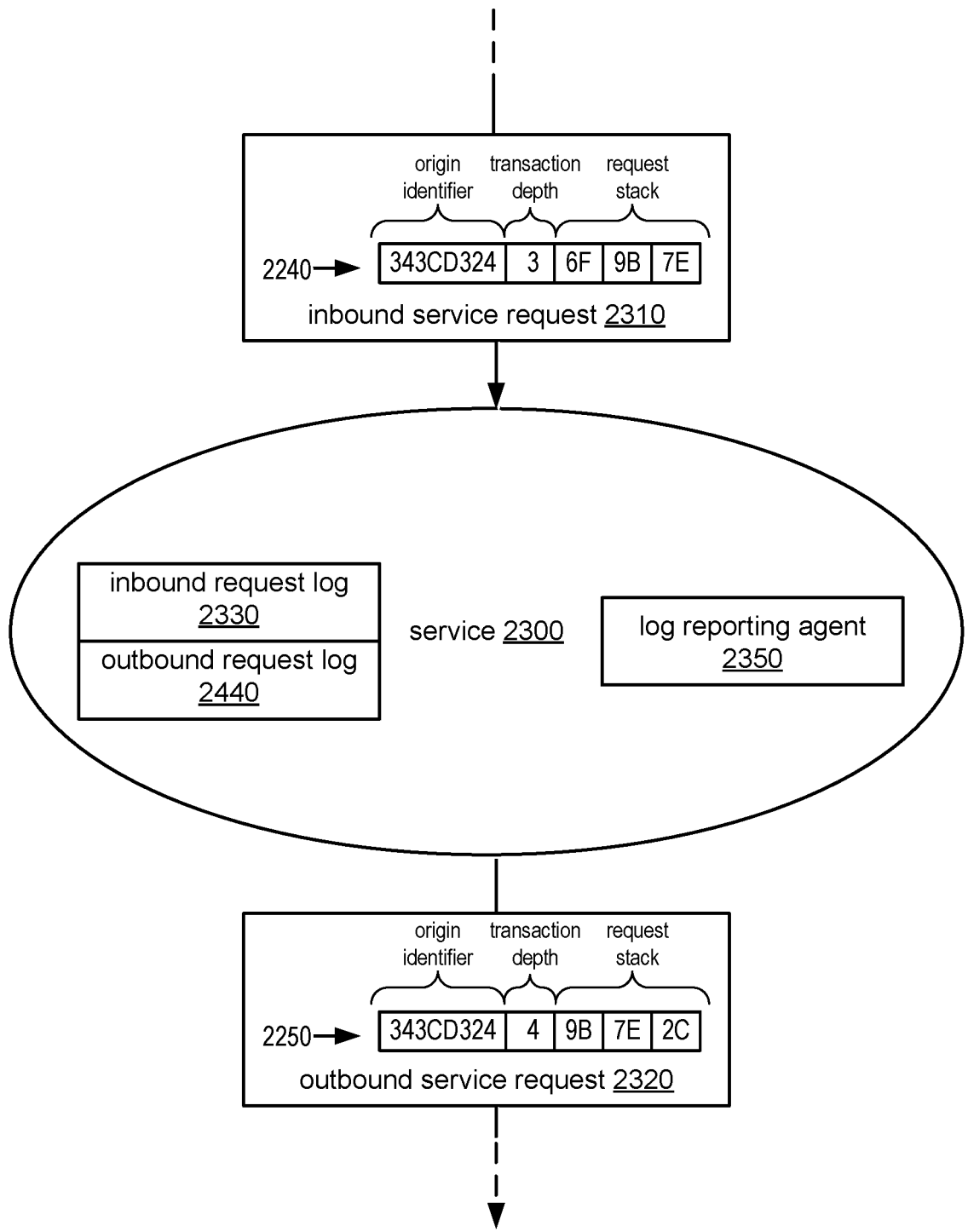
FIG. 10 illustrates one example of a service of a service-oriented system, according to some embodiments.

Referring collectively to FIG. 9 and FIG. 10, a representation of the receipt of an inbound service request (or service call) 2310 as well as the issuance of an outbound request 2320 by service 2300 is illustrated. Request identifiers 2240 and 2250 of FIG. 10 may correspond to the like-numbered elements of FIG. 9. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 9. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 11:
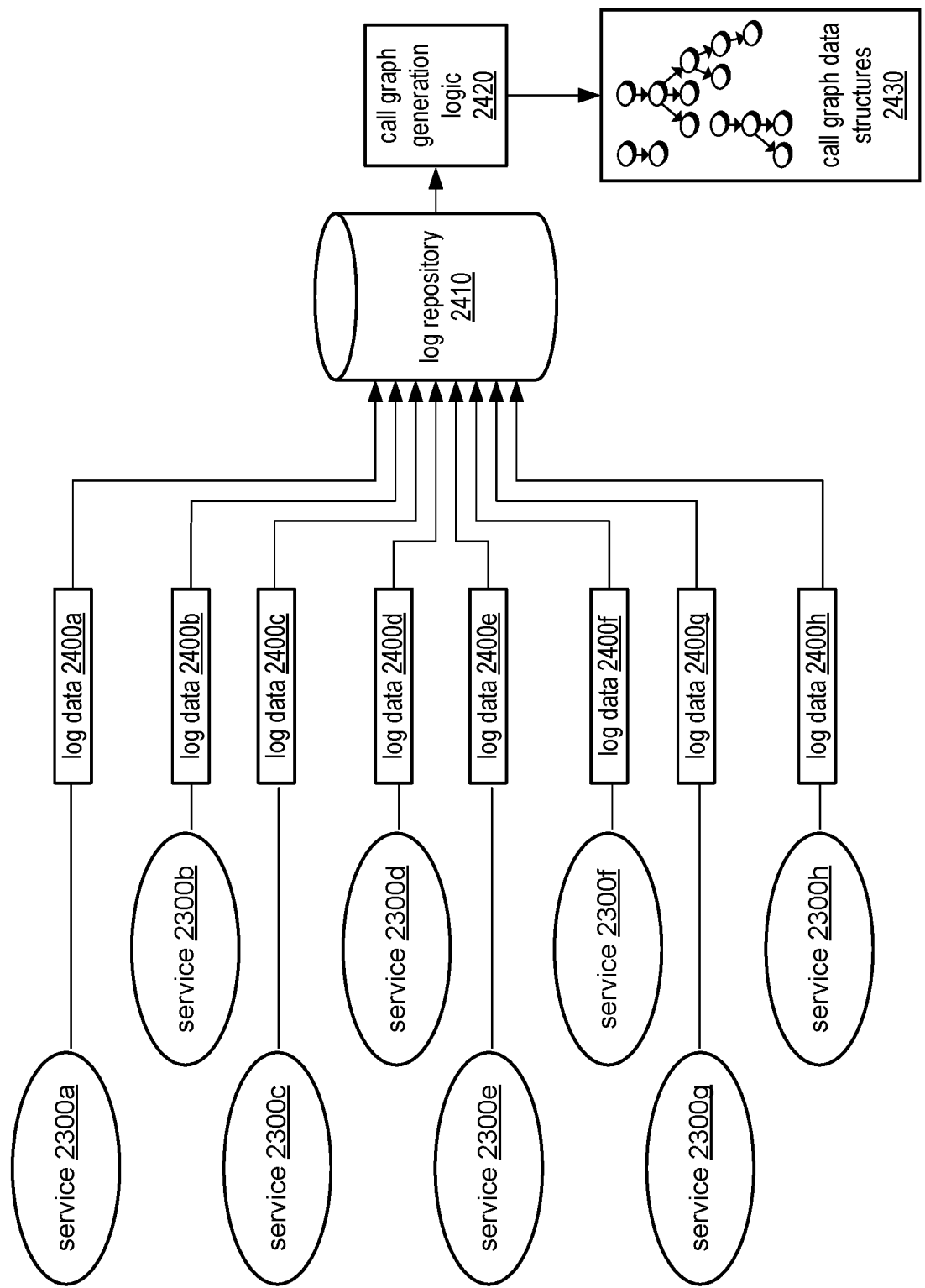
FIG. 11 illustrates an example data flow diagram for the collection of log data and generation of a call graph, according to some embodiments.

Referring collectively to FIG. 10 and FIG. 11, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 11. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 11, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 12:
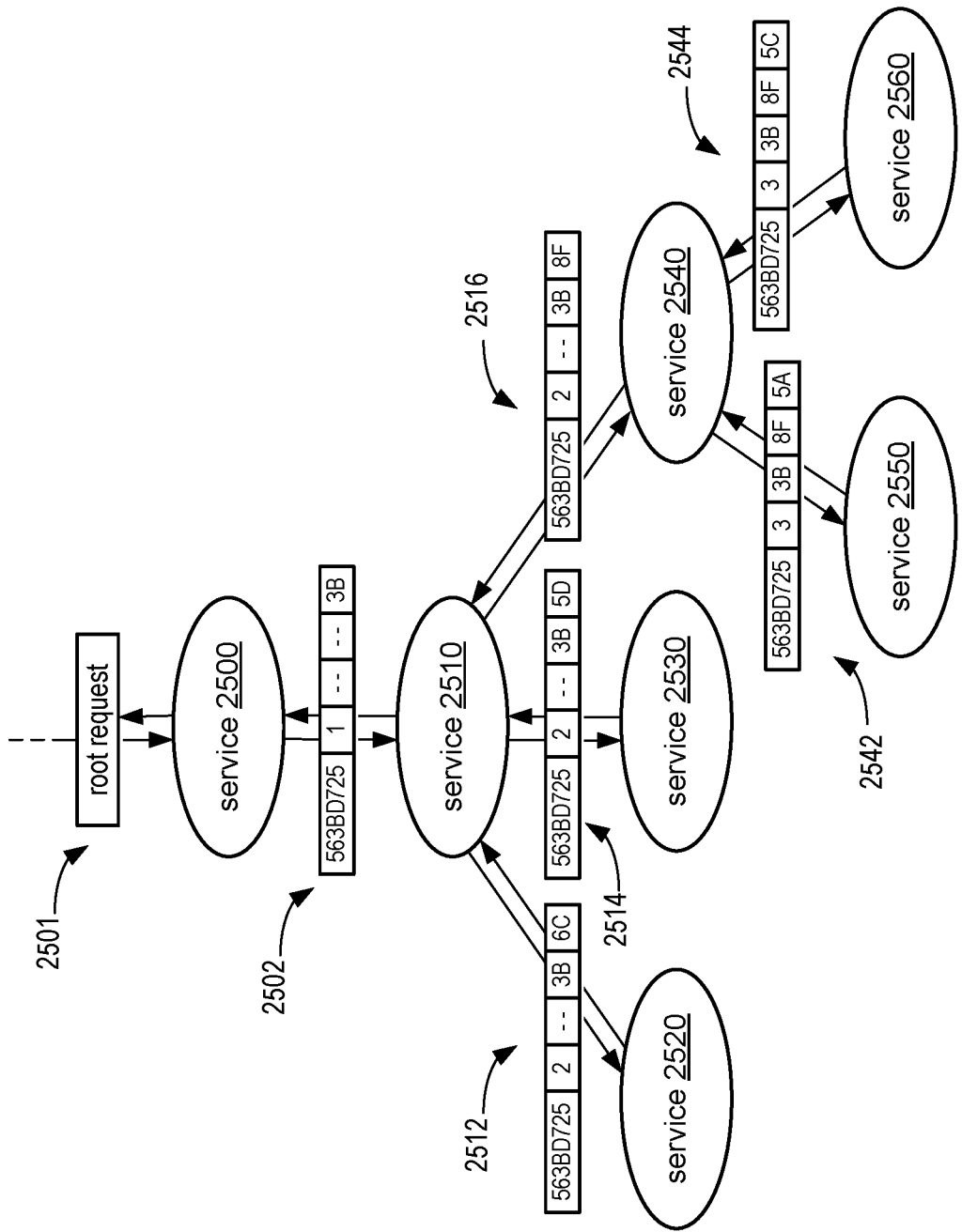
FIG. 12 illustrates an example visual representation of a call graph and request identifiers from which such call graph is generated, according to some embodiments.

FIG. 12 illustrates a visual representation of such a call graph data structure that may be generated by call graph generation logic 2420. In various embodiments, a call graph data structure may include any data structure that specifies, for a given root request, all the services called to fulfill that root request. Note that while FIG. 12 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 12 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 8. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 12 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 10 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 10, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 10, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 10.

In various embodiments, the call graph generation logic may also generate the new depth value such that the new depth value is a result of incrementing the first depth value. For example, in the illustrated embodiment of FIG. 10, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 10, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 8.

Figure 13:
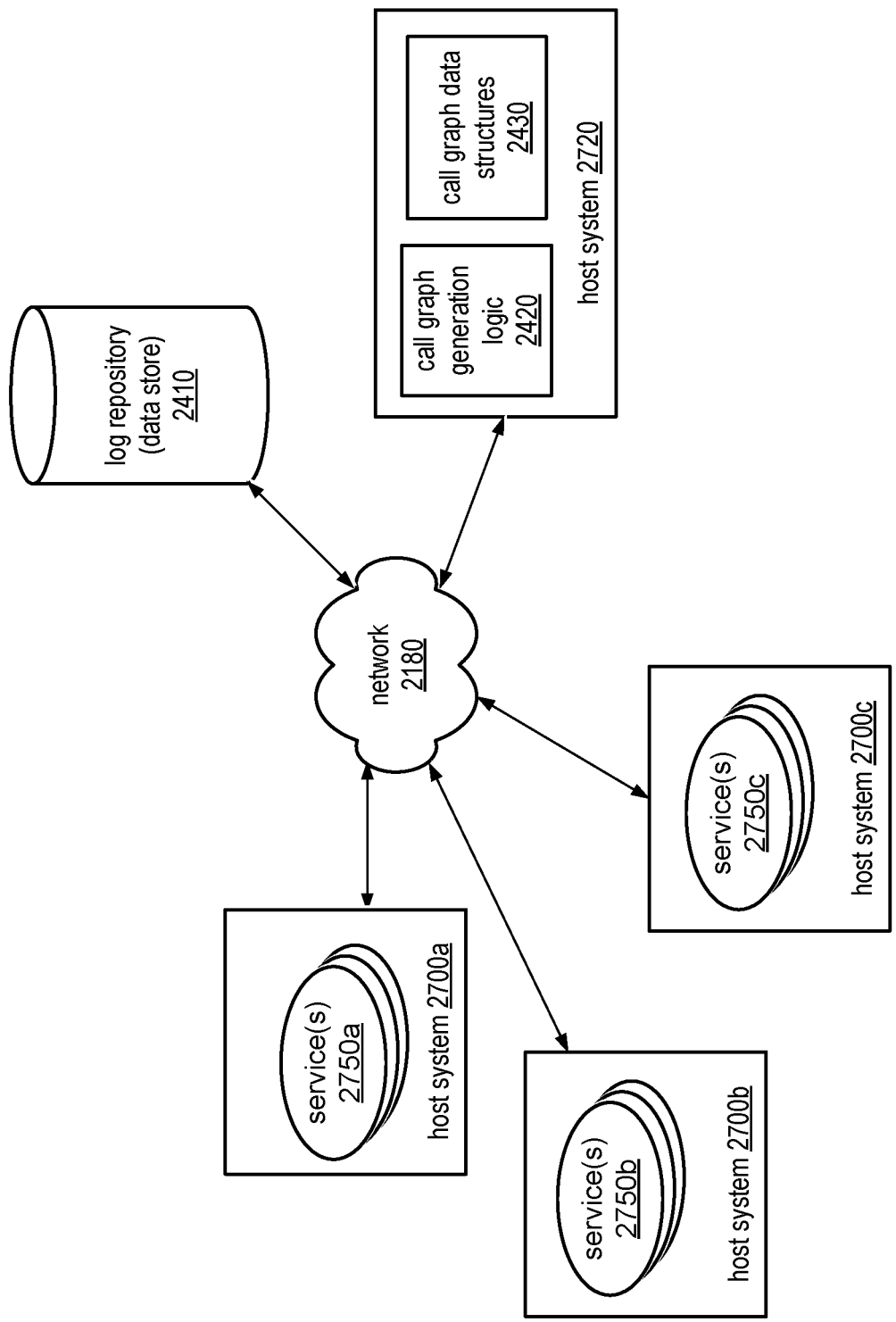
FIG. 13 illustrates an example system configuration for tracking service requests, according to some embodiments.

One example system configuration for tracking service requests is illustrated in FIG. 13. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700*a-c* and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700*a* may be configured to execute program instruction to implement one or more services 2750*a*. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700*b-c* and services 2750*b-c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 14 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more processors and one or more memories to store computer-executable instructions that, when executed, cause the one or more processors to:
      generate a plurality of patterns to match respective ones of the plurality of predefined data values that correspond to respective types of data to be detected, wherein the plurality of predefined data values were injected into a plurality of services;
      cause a plurality of service requests or responses to be generated among the plurality of services, wherein the plurality of services are configured to compare the plurality of service requests or responses to the plurality of patterns;
      receive, from the plurality of services, data indicative of one or more data flows of the one or more predefined data values between the plurality of services;
      receive, from the plurality of services, additional data indicative of one or more additional data flows of the one or more predefined data values between the plurality of services;
      detect one or more changes among the plurality of services based at least in part on a comparison of the one or more data flows to the one or more additional data flows; and
      generate a notification or an alarm based on the detected one or more changes among the plurality of services.

2. The system as recited in claim 1, wherein the one or more additional data flows represent a different time window than the one or more data flows.

3. The system as recited in claim 1, wherein the one or more additional data flows represent a different execution environment than the one or more data flows.

4. The system as recited in claim 1, wherein the one or more data flows are represented using a first call graph, and wherein the one or more additional data flows are represented using a second call graph.

5. The system as recited in claim 4, wherein the one or more changes among the plurality of services are represented using a call graph delta between the first call graph and the second call graph.

6. The system as recited in claim 4, wherein the one or more changes among the plurality of services correspond to one or more nodes in the first call graph or second call graph, and wherein the one or more nodes in the first call graph or second call graph are highlighted in a report.

7. A method, comprising:
generating a plurality of patterns to match respective ones of the plurality of predefined data values that correspond to respective types of data to be detected, wherein the plurality of predefined data values were injected into a plurality of services;
causing a plurality of service requests or responses to be generated among the plurality of services, wherein the plurality of services are configured to compare the plurality of service requests or responses to the plurality of patterns;
receiving, from the plurality of services, data indicative of one or more data flows of the one or more predefined data values between the plurality of services;
receiving, from the plurality of services, additional data indicative of one or more additional data flows of the one or more predefined data values between the plurality of services;
detecting one or more changes among the plurality of services based at least in part on a comparison of the one or more data flows to the one or more additional data flows; and
generating a notification or an alarm based on the detected one or more changes among the plurality gf services.

8. The method as recited in claim 7, wherein the one or more additional data flows represent a different time window than the one or more data flows.

9. The method as recited in claim 7, wherein the one or more additional data flows represent a different execution environment than the one or more data flows.

10. The method as recited in claim 7, wherein the one or more data flows are represented using a first call graph, and wherein the one or more additional data flows are represented using a second call graph.

11. The method as recited in claim 10, wherein the one or more changes among the plurality of services are represented using a call graph delta between the first call graph and the second call graph.

12. The method as recited in claim 10, wherein the one or more changes among the plurality of services correspond to one or more nodes in the first call graph or second call graph, and wherein the one or more nodes in the first call graph or second call graph are highlighted in a report.

13. One or more non-transitory computer-readable storage media storing program instructions that, when executed on or across one or more processors, perform:
generating a plurality of patterns to match respective ones of the plurality of predefined data values that correspond to respective types of data to be detected, wherein the plurality of predefined data values were injected into a plurality of services;
causing a plurality of service requests or responses to be generated among the plurality of services, wherein the plurality of services are configured to compare the plurality of service requests or responses to the plurality of patterns;
receiving, from the plurality of services, data indicative of one or more data flows of the one or more predefined data values between the plurality of services;
receiving, from the plurality of services, additional data indicative of one or more additional data flows of the one or more predefined data values between the plurality of services;
detecting one or more changes among the plurality of services based at least in part on a comparison of the one or more data flows to the one or more additional data flows; and
generating a notification or an alarm based on to the detected one or more changes among the plurality of services.

14. The one or more non-transitory computer-readable storage media as recited in claim 13, wherein the one or more additional data flows represent a different time window than the one or more data flows.

15. The one or more non-transitory computer-readable storage media as recited in claim 13, wherein the one or more additional data flows represent a different execution environment than the one or more data flows.

16. The one or more non-transitory computer-readable storage media as recited in claim 13, wherein the one or more data flows are represented using a first call graph, and wherein the one or more additional data flows are represented using a second call graph.

17. The one or more non-transitory computer-readable storage media as recited in claim 16, wherein the one or more changes among the plurality of services are represented using a call graph delta between the first call graph and the second call graph.

18. The one or more non-transitory computer-readable storage media as recited in claim 16, wherein the one or more changes among the plurality of services correspond to one or more nodes in the first call graph or second call graph, and wherein the one or more nodes in the first call graph or second call graph are highlighted in a report.

* * * * *